Figure 6:
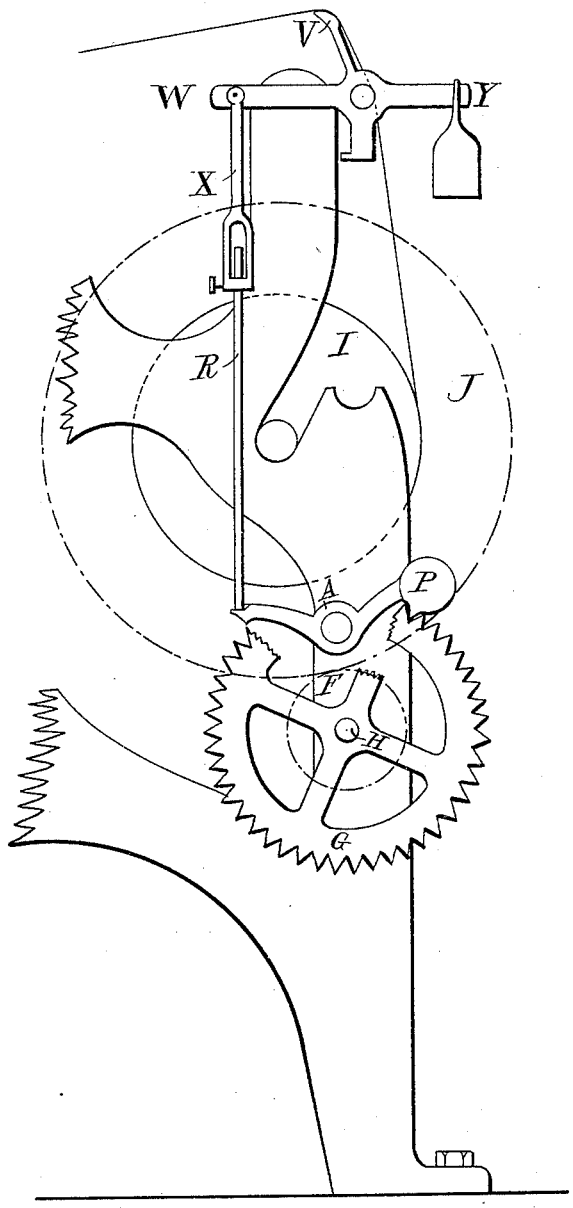

(No Model.) 2 Sheets—Sheet 1.
J. J. HONAN.
LET-OFF MOTION FOR LOOMS.
No. 394,184. Patented Dec. 11, 1888.
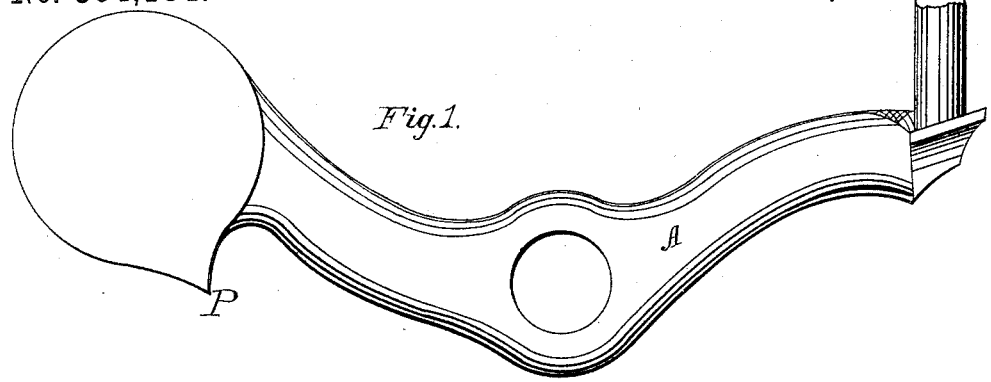
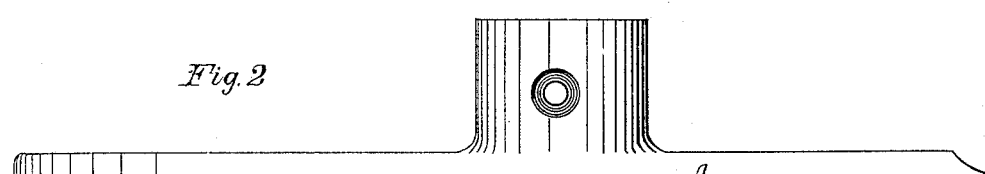
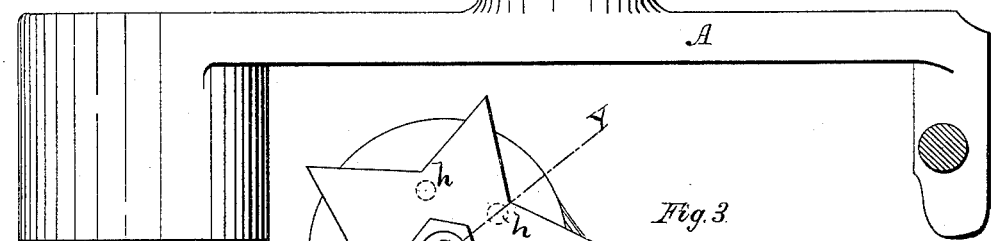
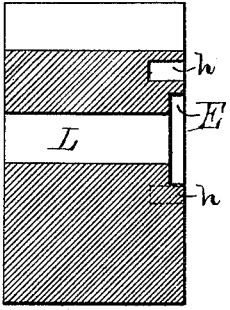
Section on line X Y.
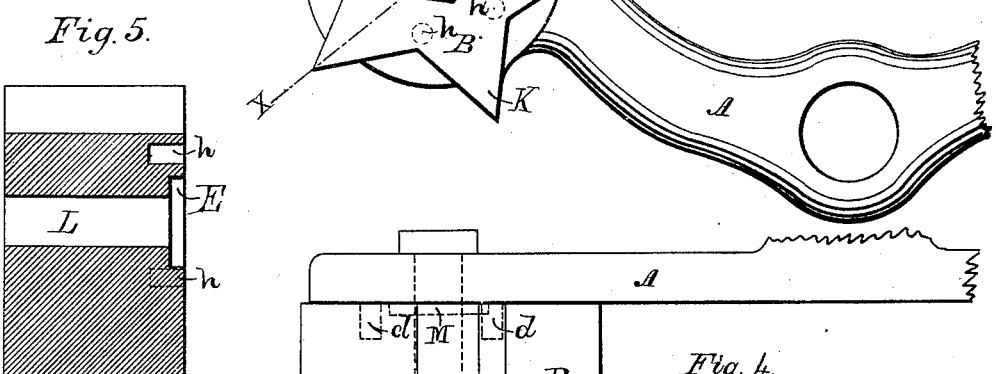
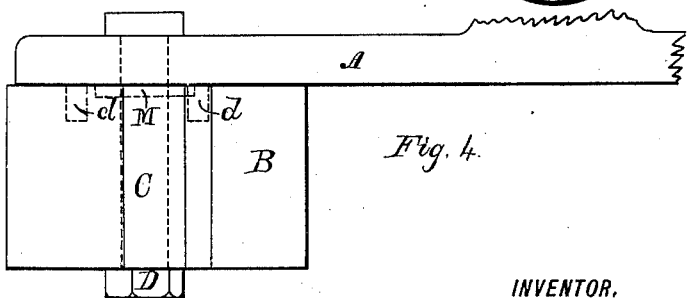
WITNESSES:
Albert Wolstenholme
B. Thomas Buffinton
INVENTOR,
John J. Honan.
BY
Thomas Kieran,
ATTORNEY.

(No Model.) 2 Sheets—Sheet 2.

J. J. HONAN.
LET-OFF MOTION FOR LOOMS.

No. 394,184. Patented Dec. 11, 1888.

WITNESSES:
B. Thomas Buffinton,
Albert Wolstenholme.

INVENTOR:
John J. Honan,
BY
Thomas Kieran.
ATTORNEYS.

UNITED STATES PATENT OFFICE.

JOHN J. HONAN, OF FALL RIVER, MASSACHUSETTS.

LET-OFF MOTION FOR LOOMS.

SPECIFICATION forming part of Letters Patent No. 394,184, dated December 11, 1888.

Application filed March 29, 1888. Serial No. 268,895. (No model.)

*To all whom it may concern:*

Be it known that I, JOHN J. HONAN, a citizen of the United States, residing at Fall River, in the county of Bristol and State of Massachusetts, have invented a new and useful Improvement in Let-Off Motions for Looms, of which the following is a specification.

My invention is an improvement on that class of let-off motions for looms in which the delivery of the warp is governed by escapement devices controlled by the whip-roll or vibrator; and it has for its object to provide a means of compensating for the wear that takes place in the nose of the dog or pallet which engages with the escapment-wheel.

My invention consists in an escapement-lever provided with a dog or pallet formed with a number of points or projections adapted to be successively adjusted in position upon the said lever for engagement with the escapement-wheel as wear occurs.

In the accompanying drawings, Figure 6 is a partial side elevation of a loom-frame and an ordinary form of escapement. Figs. 1 and 2 are side and top views, respectively, of a pallet-lever constructed in the ordinary manner, each of the said views showing, in addition, part of the rod by means of which the vibrator moves the pallet-lever. Figs. 3 and 4 are similar views of a pallet-lever provided with a dog or pallet constructed in accordance with my invention. Fig. 5 is a longitudinal section of this pallet on the line $x\,y$ of Fig. 3.

In Fig. 6, I is the warp-beam; J, the beam-gear; F, a pinion in engagement with the said gear J and mounted on a shaft, H, carrying the usual toothed escapement-wheel, G.

A is the pallet-lever, pivoted on the loom-frame and formed or provided with the usual dog or pallet, P, which, by engagement with the wheel G, holds the beam from rotating until the said dog is raised from the said teeth.

V is the usual whip-roll or vibrator, having the usual weighted arm, Y, and an arm, W, having pivoted thereto a bar, X, with which is connected the rod R. The operation of these devices, which are all old and well known, is obvious and well understood, and need not be stated herein.

In the use of this form of let-off motion the point of the dog P gradually becomes worn, and when thus worn the action of the let-off motion is unreliable, the dog failing to properly engage with the toothed wheel and hold it from rotating. I form the dog or pallet separate from the lever A, and shaped, when viewed from the end, as in Fig. 3, as a star-shaped body, B.

The dog B, I bore longitudinally at L, and one end is recessed, as at E. Through a hole in the lever A and the longitudinal dog B, I pass a bolt, C, provided with a securing-nut, D, by which the parts are held together, as shown in Figs. 3 and 4. The recess E receives an annular bearing or shoulder, M, upon the side of the lever A. (Shown in dotted lines in Fig. 4.)

Holes $h\,h\,h\,h\,h$ are bored in the end of the dog B for the reception of pins $d\,d$ on the lever A, also shown by dotted lines in Fig. 4, these pins assisting in the adjustment of the dog B into the proper position, and also securing it from any accidental movement.

The dog B, applied to the lever A, operates in connection with the wheel G in precisely the same manner as does the old form of dog represented in Figs. 1, 2, and 6, the tooth K in Fig. 3 being the one which will engage with the escapement-wheel G; but when the said tooth becomes so worn as to fail to properly engage with the escapement-wheel a new tooth may be moved into its place by running off the nut D, withdrawing the dog from the bolt far enough to clear the pins $d\,d$, and giving a partial rotation to the dog, and this may be done without stopping the loom. The shoulder M serves to properly seat the dog upon the lever A.

Having described my invention and the best manner with which I am acquainted in which the same may be reduced to practice, I claim as of my invention and desire to secure by Letters Patent—

1. The combination, with the pallet-lever A, of a dog made separate from the said lever and constructed with a number of wearing sides or teeth, and means for clamping the said dog in adjusted position upon the said lever, substantially as described.

2. The combination, with the lever A, having shoulder M and pins $d\,d$, of the dog B, having a number of teeth or engaging-surfaces, as described, and formed with the recess E, holes $h$, and bore L, of the bolt C and nut D, all substantially as described.

JOHN J. HONAN.

Witnesses:
GEORGE A. HYDE,
HENRY H. EARL.